United States Patent
Spyra (10) Patent No.: US 12,473,870 B2
(45) Date of Patent: Nov. 18, 2025

(54) INTERNAL COMBUSTION ENGINE AND METHOD FOR OPERATING AN INTERNAL COMBUSTION ENGINE

(71) Applicant: INNIO Jenbacher GmbH & Co OG, Jenbach (AT)

(72) Inventor: Nikolaus Spyra, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/688,347

(22) PCT Filed: Sep. 3, 2021

(86) PCT No.: PCT/AT2021/060308
§ 371 (c)(1),
(2) Date: Feb. 29, 2024

(87) PCT Pub. No.: WO2023/028625
PCT Pub. Date: Mar. 9, 2023

(65) Prior Publication Data
US 2024/0352904 A1    Oct. 24, 2024

(51) Int. Cl.
*F02D 41/40* (2006.01)
*F02B 19/10* (2006.01)
(Continued)

(52) U.S. Cl.
CPC .......... *F02D 41/40* (2013.01); *F02B 19/1023* (2013.01); *F02B 19/1085* (2013.01);
(Continued)

(58) Field of Classification Search
CPC ............... F02D 41/40; F02M 21/0206; F02M 21/0275; F02M 21/0278; F02B 19/1019; F02B 19/0689
See application file for complete search history.

(56) References Cited

U.S. PATENT DOCUMENTS 4,079,703 A    3/1978   Yamane et al.
7,150,265 B2   12/2006  Shibagaki
(Continued)

FOREIGN PATENT DOCUMENTS

DE    102004062095 A1    7/2006
EP         1832738 A2    9/2007
(Continued)

OTHER PUBLICATIONS

PCT International Search Report and Written Opinion; Application No. PCT/AT2021/060308; dated May 31, 2022; 17 pages.

*Primary Examiner* — Ngoc T Nguyen
(74) *Attorney, Agent, or Firm* — Fletcher Yoder, P.C.

(57) ABSTRACT

An engine controller, for an internal combustion engine, is configured to:
control at least one actuator to provide an air-fuel mixture with a lambda value higher than 3 to a main combustion chamber via at least one intake valve, wherein the at least one actuator is arranged upstream of at least one intake port or which is arranged in the intake port;
control at least one fuel supply system to provide fuel directly to the main combustion chamber and/or a pre-combustion chamber of a piston-cylinder unit such that at the time of ignition of the air-fuel mixture the lambda value of that air-fuel mixture in the main combustion chamber is lower than the lambda value of the air-fuel mixture provided to the main combustion chamber via the at least one intake valve.

20 Claims, 5 Drawing Sheets

(51) Int. Cl.
  *F02D 19/02*   (2006.01)
  *F02D 41/00*   (2006.01)
  *F02D 41/30*   (2006.01)
  *F02M 21/02*   (2006.01)
  *F02D 41/38*   (2006.01)

(52) U.S. Cl.
  CPC ....... *F02D 19/024* (2013.01); *F02D 41/0047* (2013.01); *F02D 41/3094* (2013.01); *F02M 21/0206* (2013.01); *F02M 21/0275* (2013.01); *F02M 21/0278* (2013.01); *F02B 19/1019* (2013.01); *F02D 2041/389* (2013.01)

(56) References Cited

U.S. PATENT DOCUMENTS

| 7,822,530 | B2 | 10/2010 | Shinagawa et al. |
| 2006/0090732 | A1 | 5/2006 | Shibagaki |

FOREIGN PATENT DOCUMENTS

| EP | 3936713 | A1 | 1/2022 |
| JP | 2016044671 | A | 4/2016 |
| WO | 2013022630 | A1 | 2/2013 |
| WO | 2017184610 | A1 | 10/2017 |
| WO | 20200183522 | A1 | 9/2020 |

INTERNAL COMBUSTION ENGINE AND METHOD FOR OPERATING AN INTERNAL COMBUSTION ENGINE

CROSS-REFERENCE TO RELATED APPLICATION

This application is a National Stage entry from, and claims benefit of, PCT Application No. PCT/AT2021/060308, filed on Sep. 3, 2021, entitled "INTERNAL COMBUSTION ENGINE AND METHOD FOR OPERATING AN INTERNAL COMBUSTION ENGINE", which is herein incorporated by reference in its entirety.

BACKGROUND

The present invention concerns an internal combustion engine and a method for operating an internal combustion engine.

Internal combustion engines known by the state of the art comprise piston-cylinder units, wherein in the main combustion chamber of the piston-cylinder units an air-fuel mixture is combustible.

The air-fuel mixture is supplied to the main combustion chamber of the piston-cylinder units by using at least one intake port. The intake ports are fluidically connected with the main combustion chambers of the piston-cylinder units and can be separated from the at least one piston-cylinder unit via intake valves.

By using exhaust ports, an exhaust gas generated by the combustion of the air-fuel mixture can be discharged from the main combustion chamber. The exhaust ports are fluidically connected to the main combustion chamber of the piston-cylinder unit and can be separated from the at least one piston-cylinder unit via at least one exhaust valve.

Supply lines are used to connect fuel supply systems with the intake ports of the main combustion chamber or the pre-combustion chamber of the piston-cylinder units to supply an air-fuel mixture into the main combustion chamber directly or into a pre-chamber.

The ratio of fuel to air in the mixture supplied to the main combustion chambers is stated as the excess-air ratio (lambda, $\lambda$). An excess-air ratio (lambda) of $\lambda=1$ means that the amount of air present in the mixture corresponds exactly to the amount that is required to allow complete combustion of that amount of fuel. In such a case, combustion takes place stoichiometrically.

In the past few years, research and development have produced more and more operation strategies for internal combustion engines using alternative fuels in order to reduce emissions and finding new fuel resources.

For some of such alternative fuels, for example hydrogen, the flammability is much higher than the flammability of the traditional fuels such as natural gas.

For such fuels, conventional fuel air supply where the fuel air mixture is created in or before an intake manifold with the total amount of fuel to be provided to the piston cylinder units is unwanted, as it creates large volumes of fuel air mixture with high tendency to combust. Combustion or even explosive events in the supply system may of course damage or destroy the supply system, and may even present danger for operating personnel in the vicinity of the internal combustion engine.

As an alternative, injectors for directly injecting the fuel into the main combustion chamber may be used.

A disadvantage of such configurations is that starting at a certain size of the internal combustion engines the injectors used to generate the air-fuel mixture provided for the main combustion engine have to be constructed and manufactured with complex structures and/or big dimensions in single item production substantially increasing the effort and costs for the manufacturing process.

Especially, the injectors for alternative fuels (e.g., hydrogen) are much more complicated, expensive, and not available in certain sizes, as they are not commonly used to generate air-fuel mixtures starting at a certain air-fuel volume, which has to be provided.

BRIEF DESCRIPTION

An aspect of the invention is to provide an internal combustion engine and a method for operating an internal combustion engine, wherein the risk of misfires, backfires, or unwanted combustion in the supply system and/or in the intake port compared to the state of the art can be reduced, and/or to provide an internal combustion engine and a method for operating an internal combustion engine having a more secure combustion in the main combustion chamber and/or wherein a simpler or easier way or construction for providing the air-fuel mixture is generated.

This aspect is achieved by an internal combustion engine with the features of the claims and a method for operating an internal combustion engine with the features of the claims.

By a first variant of the invention, it is provided, that an internal combustion engine comprises:
- at least one piston-cylinder unit in which an air-fuel mixture, preferably an air-hydrogen mixture, is combustible,
- at least one intake port fluidically connected to the at least one piston-cylinder unit of the internal combustion engine, the at least one intake port being fluidically separable from the at least one piston-cylinder unit via at least one intake valve, at least one exhaust port fluidically connected to the at least one piston-cylinder unit of the internal combustion engine, the at least one exhaust port being fluidically separable from the at least one piston-cylinder unit via at least one exhaust valve,
- a fuel supply line fluidically connected to at least one fuel supply system, the at least one fuel supply system being configured to supply fuel, preferably hydrogen, directly into a main combustion chamber and/or a pre-combustion chamber of the at least one piston cylinder unit, and
- an engine control device for controlling the operation of the internal combustion engine, wherein the control device is configured to:
- control at least one actuator to provide an air-fuel mixture with a lambda value higher than 3 (three) to the main combustion chamber via the at least one intake valve, wherein the at least one actuator is arranged upstream of the at least one intake port or which is arranged in the intake port;
- control the at least one fuel supply system to provide fuel directly to the main combustion chamber and/or the pre-combustion chamber of the piston-cylinder unit such that at the time of ignition of the air-fuel mixture, the lambda value of that air-fuel mixture in the main combustion chamber is lower than the lambda value of the air-fuel mixture provided to the main combustion chamber via the at least one intake valve.

According to certain embodiments of the invention, it is provided that only a lean air-fuel mixture (having an excess-air ratio $\lambda>3$) is supplied via the intake port into the main combustion chamber of the at least one piston-cylinder unit, wherein the flammability and the combustibility of the air-fuel mixture is increased in the main combustion chamber by the enrichment using the fuel supply line, which fuel supply line is provided to supply fuel directly into the main combustion chamber or a fluidically connected pre-combustion chamber into the main combustion chamber.

Therefore, the air-fuel mixture reaches the ideal flammability and/or combustibility only in the main combustion chamber shortly before being ignited and combusted.

The air-fuel mixture being present in the intake ports does only have very low tendencies regarding flammability and/or combustibility, wherein the risk of misfires, backfires or inflammations in the port can be reduced significantly.

At the same time, it is possible to use much smaller and simpler injectors for the main combustion chamber and/or the pre-combustion chamber according to embodiments of the invention, as the total fuel mass is split up into two independent injection or mixing processes.

According to a second variant of the invention, it can be provided that an internal combustion engine comprises:
- at least one piston-cylinder unit in which an air-fuel mixture, preferably an air-hydrogen mixture, is combustible,
- at least one intake port fluidically connected to the at least one piston-cylinder unit of the internal combustion engine, the at least one intake port being fluidically separable from the at least one piston-cylinder unit via at least one intake valve,
- at least one exhaust port fluidically connected to the at least one piston-cylinder unit of the internal combustion engine, the at least one exhaust port being fluidically separable from the at least one piston-cylinder unit via at least one exhaust valve,
- a fuel supply line fluidically connected to at least one fuel supply system, the at least one fuel supply system being configured to supply fuel, preferably hydrogen, directly into a main combustion chamber and/or a pre-combustion chamber of the at least one piston cylinder unit, and
- an exhaust gas recirculation system (EGR) comprising an exhaust gas recirculation valve, and
- an engine control device for controlling the operation of the internal combustion engine, wherein the control device is configured to:
  - control at least one actuator to provide an air-fuel mixture with a lambda value higher than 1.3 to the main combustion chamber via the at least one intake valve, wherein the at least one actuator is arranged upstream of the at least one intake port or which is arranged in the intake port;
  - control the exhaust gas recirculation valve to admix up to 50% of the exhaust gas to the air-fuel mixture provided to the main combustion chamber via the at least one intake valve; and
  - control the at least one fuel supply system to provide fuel directly to the main combustion chamber and/or the pre-combustion chamber of the piston-cylinder unit such that at the time of ignition of the air-fuel mixture the lambda value of that air-fuel mixture in the main combustion chamber is lower than the lambda value of the air-fuel mixture provided to the main combustion chamber via the at least one intake valve.

According to the second variant of the invention, an exhaust gas recirculation system is provided, wherein the air-fuel mixture supplied to the main combustion chamber via the intake ports does already comprise a percentage of exhaust gases, wherein the exhaust gases also decrease the tendency of flammability and/or combustibility. Therefore, compared to the first embodiment, lower excess-air ratios ($\lambda > 1.3$) can be provided in the intake port, wherein combined with the exhaust gas recirculation also the risk of misfires, backfires or inflammations in the port can be reduced significantly (more or less in the same extent as by the first embodiment).

Therefore, the same advantages apply for both of the variants of the invention.

Preferably, it can be provided that the control device is configured to control the at least one actuator to provide an air-fuel mixture in such a way that the lambda value higher than the given values of the following table is provided to the main combustion chamber via the at least one intake valve if the corresponding value of the rate of exhaust gas recirculation (EGR-rate) (also given in the following table) is present. Of course, this table can also be used to interpolate or calculate interim values of the lower bounds for the lambda values for given values of the rate of exhaust gas recirculation (EGR-rate) between, above or below the stated values.

| EGR rate [%] | Lambda value |
| --- | --- |
| 0 | >3 |
| 10 | >2.4 |
| 20 | >2 |
| 30 | >1.8 |
| 40 | >1.5 |
| 50 | >1.3 |

As a consequence of the non-ideal mixing procedure in the main combustion chamber and possibly the turbulence within the main combustion chamber, a lambda value at the time of ignition in the main combustion chamber may be inhomogeneous (wherein spatially distributed locations with higher and lower lambda values are present at the same time). According to certain embodiments of the invention, the lower bounds on the lambda values are of course still realized as average values over the volume of the main combustion chamber as given in the claims.

Starting from a certain size of gas engines (generally with cylinder capacity above about six liters), it is necessary to use ignition intensifiers or amplifiers in order to properly ignite the air fuel mixture in the large volume of the cylinders.

Pre-chambers usually serve as such ignition intensifiers, wherein the air-fuel mixture that is highly compressed at the end of the compression stroke is ignited in a relatively small secondary space (in the pre-chamber) separate from the main combustion chamber of the cylinders. In this case, the main combustion chamber is delimited by the working piston, the cylinder liner and (a flame plate of) the cylinder head, wherein the secondary space (the pre-chamber) is connected with the main combustion chamber via one or a plurality of transfer passages.

Preferred embodiments are defined in the dependent claims.

Preferably, it can be provided, that that the control device is configured to control the at least one fuel supply system to provide fuel to the main combustion chamber and/or the pre-combustion chamber of the piston-cylinder unit such that at the time of ignition of the air-fuel mixture the lambda value of that air-fuel mixture in the main combustion chamber is lower than 3.5 and higher than 1.5 in the case when the air-fuel mixture provided to the piston-cylinder unit via the at least one intake valve is 3.5 or more.

It can be provided, that the control device is configured to control the at least one fuel supply system to provide fuel to the piston-cylinder unit such that at the time of ignition of the air-fuel mixture, the lambda value of that air-fuel mixture in the main combustion chamber is lower than 2.7 and higher than 2.1, particularly preferably 2.5.

Preferably, it can be provided, that the control device is configured to control the at least one fuel supply system to provide fuel to the main combustion chamber and/or the pre-combustion chamber of the piston-cylinder unit such that at the time of ignition of the air-fuel mixture, the lambda value of that air-fuel mixture in the piston-cylinder unit is lower than 1.1 and higher than 0.9.

It can be provided that the fuel supply system comprises a passive and/or active gas valve and/or at least one direct injection valve configured to directly supply fuel to the main combustion chamber and/or the pre-combustion chamber. A passive and/or active gas valve configured to directly supply fuel to the pre-combustion chamber can be called a pre-combustion chamber gas valve.

Preferably, it can be provided that that the actuator is a fuel supply valve arranged upstream of the intake port, wherein the fuel supply valve is fluidically connected to a mixing device. The supply valve can also be thought of as being part of the mixing device.

It can be provided that the mixing device is configured to mix air with fuel from a fuel source provided via the fuel supply valve.

Preferably, it can be provided that the mixing device is arranged up- or downstream of a compressor of a turbo charger.

It can be provided that the actuator is a port injection valve being arranged in the at least one intake port. Port injection valves are typically arranged in a part of the intake manifold downstream of a branching for the individual main combustion chambers.

Furthermore, protection is sought for a method for operating an internal combustion engine, comprising the following steps:
provide an air-fuel mixture, preferably an air-hydrogen mixture, with a lambda value higher than 3 to a main combustion chamber of at least one piston-cylinder unit via at least one intake valve and
provide fuel, preferably hydrogen, directly to a main combustion chamber and/or a pre-combustion chamber of the piston-cylinder unit via at least one fuel supply system in such way that at the time of ignition of the air-fuel mixture the lambda value of the air-fuel mixture in the main combustion chamber and/or a pre-combustion chamber is lower than the lambda value of the air-fuel mixture provided to the main combustion chamber via the at least one intake valve.

It can be provided that at essentially maximum power output of the internal combustion engine, fuel is provided to the main combustion chamber and/or the pre-combustion chamber of the piston-cylinder unit via the at least one fuel supply system in such way that at the time of ignition of the air-fuel mixture the lambda value of the air-fuel mixture in the main combustion chamber is lower than 3.5, preferably lower than 2.7 and higher than 1.5, particularly preferably higher than 2.1.

Protection is also sought for a method for operating an internal combustion engine, comprising the following steps:
provide an air-fuel mixture, preferably an air-hydrogen mixture, with a lambda value higher than 1.3 to a main combustion chamber of at least one piston-cylinder unit via at least one intake valve;
provide up to 50% of the exhaust gas to air-fuel mixture provided via the at least one intake valve; and
provide fuel, preferably hydrogen, to the main combustion chamber and/or a pre-combustion chamber of the piston-cylinder unit directly via the at least one fuel supply system in such way that at the time of ignition of the air-fuel mixture the lambda value of the air-fuel mixture in the main combustion chamber is lower than the lambda value of the air-fuel mixture provided to the main combustion chamber via the at least one intake valve.

Preferably, it can be provided, that at essentially 100% possible mechanical power output of the internal combustion engine, fuel is provided to the piston-cylinder unit via the at least one fuel supply system in such way that at the time of ignition of the air-fuel mixture the lambda value of the air-fuel mixture in the main combustion chamber is lower than 1.1, preferably higher than 0.9.

The air-fuel mixture provided via the at least one intake valve can be provided during an opening period of the at least one intake valve and the fuel provided with the at least one fuel supply system can be provided during an injection period of the at least one fuel supply system, wherein the injection period of the at least one fuel supply system is during a crank angle between 20° before closing of the at least one exhaust valve and 40° before the piston reaches the top dead center during a compression stroke.

Preferably, it can be provided, that the injection period of the at least one fuel supply system is during a crank angle between the closing of the at least one exhaust valve and 60° before the piston reaches the top dead center during a compression stroke.

It can be provided, that at essentially 100% possible mechanical power output of the internal combustion engine, the at least one fuel supply system is configured to provide fuel to the main combustion chamber and/or the pre-combustion chamber of the piston-cylinder unit with an energy amount of a maximum of 60% of the total energy amount provided to the piston-cylinder unit.

Therefore, e.g., for stationary engines with a performance of about 170 KW per piston-cylinder unit, injectors of smaller engines (e.g., injectors of engines from the automotive sector) can be used, wherein very favorable benefits regarding costs, availability and interchangeability can be achieved.

The possible mechanical power output of the internal combustion engine can be understood as the maximum nominal power output, independently of theoretical ways to increase the power of the internal combustion engine.

The energy amount provided to the piston-cylinder unit can be understood as the amount of energy that is released by combusting the fuel in the piston-cylinder unit.

Preferably, it can be provided that up to 33% of the maximum possible mechanical power output of the internal combustion engine, essentially 100% of the total energy amount, is provided to the main combustion chamber and/or the pre-combustion chamber of the piston-cylinder unit via the fuel supply system and/or between 33% and 66% of the maximum possible mechanical power output of the internal combustion engine, up to 60% of the total energy amount, is provided to the main combustion chamber and/or the pre-combustion chamber of the piston-cylinder unit via the fuel supply system and/or between 66% and 100% of the maximal possible mechanical power output of the internal combustion engine, up to 30% of the total energy amount, is provided to the main combustion chamber and/or the pre-combustion chamber of the piston-cylinder unit via the fuel supply system.

BRIEF DESCRIPTION OF THE DRAWINGS

Further details and advantages of the invention are apparent from the accompanying figures and the following description of the figures. The figures show.

DETAILED DESCRIPTION

Figure 1:
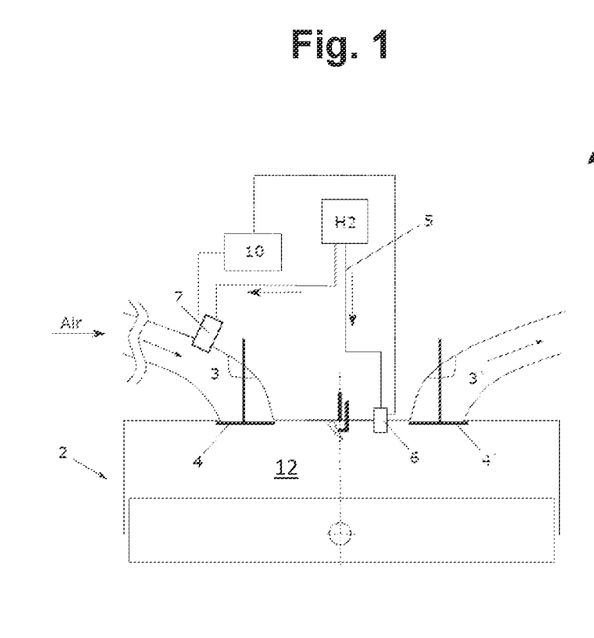
FIG. 1 illustrates a first embodiment of a piston-cylinder unit.

FIG. 1 shows a first embodiment of the present invention, wherein schematically a piston-cylinder unit 2 of an internal combustion engine 1 is shown, wherein the piston-cylinder unit 2 has a piston arranged in such way that it is movable along the axis of the cylinder, whereby a main combustion chamber 12 is formed between the piston, the cylinder head and the cylinder.

The cylinder may be designed as part of a cylinder liner and/or a crank case. For the purpose of the present invention, such components are collectively referred to as cylinder.

The intake port 3 can interface with the main combustion chamber 12 through the at least one intake valve 4.

The exhaust manifold 3' can interface with the main combustion chamber 12 through the at least one exhaust valve 4'.

The at least one intake valve 4 and the at least one exhaust valve 4' can be actuated by valve actuators. Example valve actuators for the at least one intake valve 4 and at least one exhaust valve 4' are a camshaft or hydraulic devices.

Upstream of the at least one intake valve 4, at least one compressor of a turbo charger can be provided for pressurization of the air or air-fuel mixture supplied to the main combustion chamber 12 via the intake port 3.

The ignition source provided in the main combustion chamber 12 in this embodiment is a spark plug.

In the intake port 3, a port injection valve 7 is arranged—here provided as a hydrogen injector—wherein the port injection valve 7 is configured to supply hydrogen into the intake port 3, wherein an air-fuel mixture having a lambda value greater than 3 is formed by mixing the present air in the intake port 3 with hydrogen, wherein the resulting air-hydrogen mixture is subsequently supplied via the at least one intake valve 4 into the main combustion chamber 12.

It can in principle also be provided that the mass flow present in the intake port 3 is already an air-fuel-mixture (e.g., a mixture of a further fuel, such as natural gas, and air), wherein the air-fuel mixture already present in the intake port can be enriched by the port injection valve 7 (e.g., by hydrogen), wherein an enriched air-fuel mixture having a lambda value greater than 3 is formed and supplied to the main combustion chamber.

Preferably, however, the air-fuel mixture is a mixture of a single fuel, such as hydrogen, and air.

After supplying the air-fuel mixture into the main combustion chamber 12, the air-fuel mixture is enriched by the fuel supply system 6, wherein a fuel (in this embodiment hydrogen) is supplied directly into the main combustion chamber 12.

The fuel supply system 6 comprises a supply line 5 and a fuel injector, wherein the fuel injector is connected to a hydrogen source by the supply line 5 and is configured to inject a controlled quantity of hydrogen into the main combustion chamber 12.

The enrichment of the air-fuel mixture by the fuel supply system 6, an air-fuel mixture in the main combustion chamber 12 can reach preferred combustibility and/or flammability properties before an ignition takes place by igniting via the spark plug.

The control unit 10 is configured to control:
the port injection valve 7 to provide an air-fuel mixture with a lambda value higher than 3 to the main combustion chamber 12 via the at least one intake valve 4, wherein the port injection valve 7 is arranged upstream of the at least one intake valve 4 and is arranged in the intake port 3, and
the fuel supply system 6 to provide hydrogen directly to the main combustion chamber 12 of the piston-cylinder unit 2 in such way that at the time of ignition of the air-fuel mixture the lambda value of that air-fuel mixture in the main combustion chamber 12 is lower than the lambda value of the air-fuel mixture provided to the main combustion chamber 12 via the at least one intake valve 4.

Figure 2:
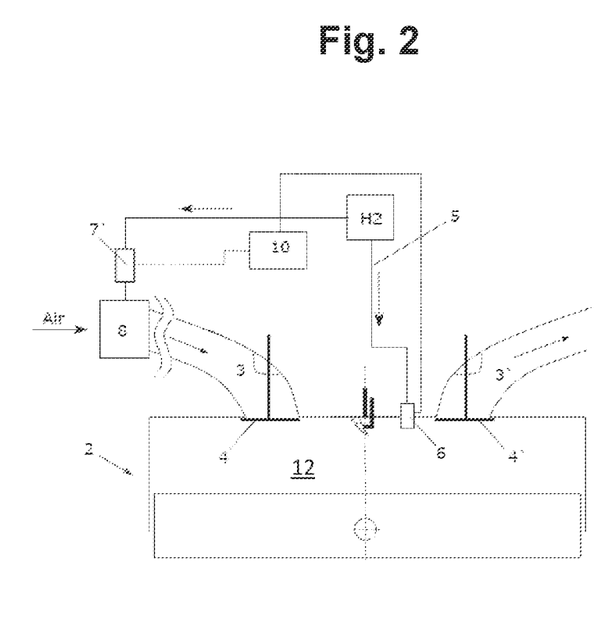
FIG. 2 illustrates a second embodiment of a piston-cylinder unit.

FIG. 2 shows a second embodiment of the present invention, wherein a further piston-cylinder unit 2 is shown schematically.

Compared to FIG. 1, the embodiment of FIG. 2 comprises a gas mixer or mixing device 8 arranged upstream of the intake port 3 (central mixture formation) and the at least one intake valve 4, wherein an air is mixed with hydrogen resulting in an air-fuel mixture having a lambda value higher than 3, which is supplied to the main combustion chamber 12 via the at least one intake valve 4.

By using the gas mixer or mixing device 8, a fuel-air-mixture (e.g., a mixture of air and hydrogen) can be provided for the intake port 3 and subsequently for the main combustion chamber 12. Furthermore, at least one compressor can be arranged upstream of the intake port 3, wherein the provided air or air-fuel mixture for the intake port 3 and subsequently for the main combustion chamber 12 can be charged.

The supplied quantity of hydrogen to the mixing device 8 can be controlled by the control device 10 using the actuator 7' (e.g., being a flow control valve).

The remaining features correspond with the embodiment of FIG. 1.

Figure 3:
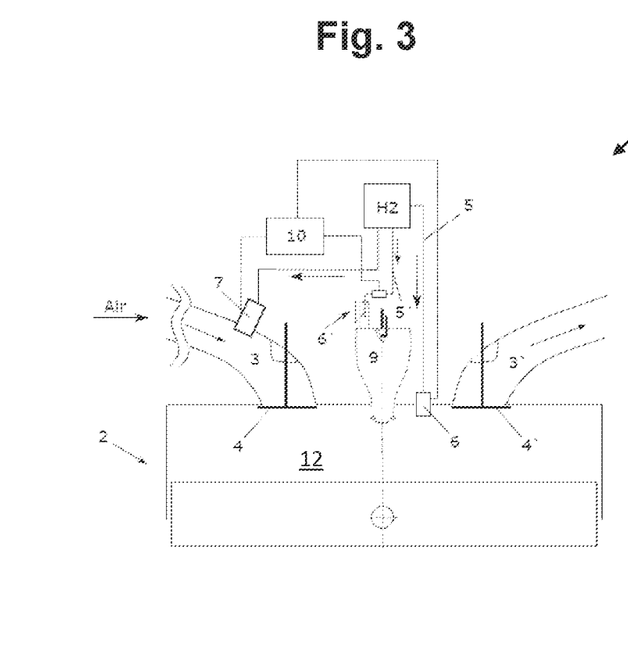
FIG. 3 illustrates a third embodiment of a piston-cylinder unit.

FIG. 3 shows a third embodiment of the present invention, wherein another piston-cylinder unit 2 is shown schematically.

The embodiment of FIG. 3 comprises a piston-cylinder unit 2 having a pre-combustion chamber 9.

The pre-combustion chamber 9 communicates with the main combustion chamber 12 via transfer passages and has an ignition source and a pre-combustion chamber gas valve 6' in the form of a check valve, which is connected to a fuel source (in this embodiment a hydrogen source).

Therefore, the fuel supply system 6 can supply fuel (hydrogen) directly into the main combustion chamber 12 by the direct injector arranged at the main combustion chamber 12 and/or via the pre-combustion chamber gas valve directly into the pre-combustion chamber 9, wherein most of the hydrogen supplied to the pre-combustion chamber 9 passes via the transfer passages into the main combustion chamber 12.

The remaining features correspond with the embodiment of FIG. 1.

Figure 4:
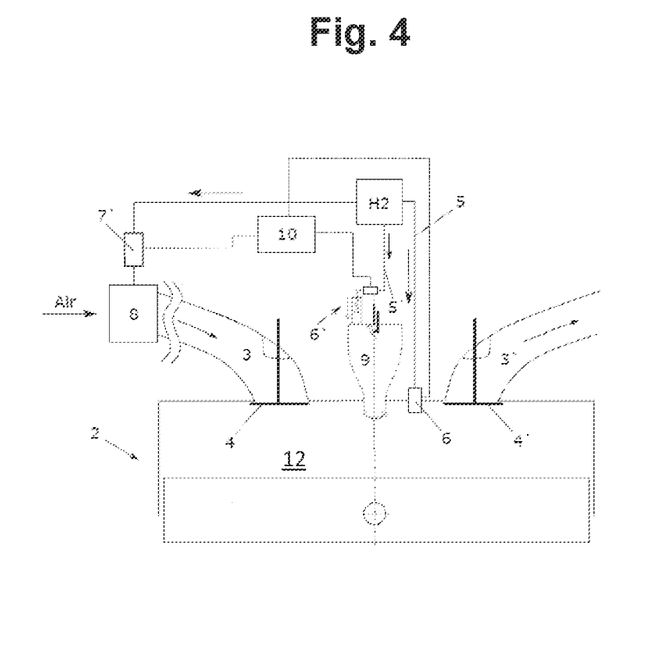
FIG. 4 illustrates a fourth embodiment of a piston-cylinder unit.

FIG. 4 shows a fourth embodiment of the present invention, wherein a further piston cylinder unit 2 is shown schematically.

FIG. 4 teaches a combination of the embodiments of FIGS. 2 and 3, wherein the air-fuel mixture supplied via the intake port 3 and the at least one intake valve 4 is provided by a mixing device 8, and wherein the piston-cylinder unit 2 comprises a pre-combustion chamber 9, wherein hydrogen can be supplied directly into the main combustion chamber 12 and directly into the pre-combustion chamber 9.

Figure 5:
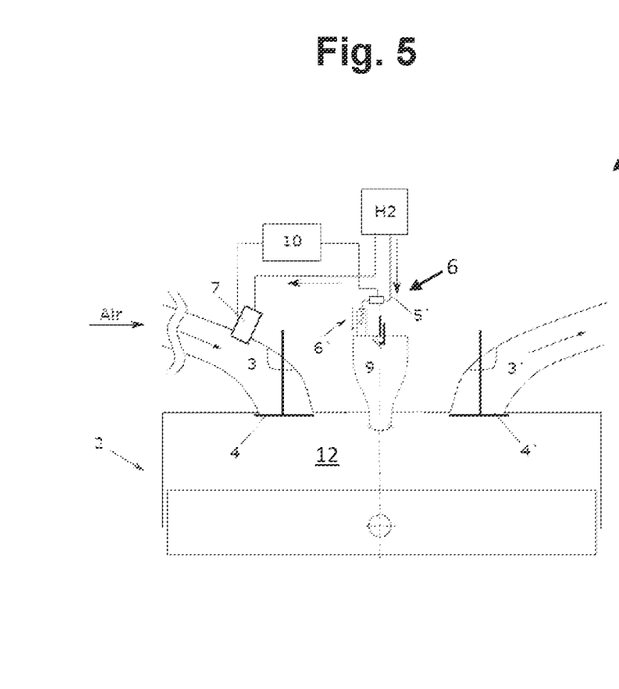
FIG. 5 illustrates a fifth embodiment of a piston-cylinder unit.

FIG. 5 shows a fifth embodiment of the present invention, wherein another piston cylinder unit 2 is shown schematically.

Compared to FIG. 3, the embodiment of FIG. 5 does only comprise a fuel supply system 6 to the main combustion chamber 12 via the pre-combustion chamber 9, wherein hydrogen can be supplied by using the supply line 5 and/or the pre-combustion chamber gas valve into the pre-combustion chamber 9, wherein the hydrogen can pass through the pre-combustion chamber 9 into the main combustion chamber 12 via the transfer passages.

The remaining features correspond with the embodiment of FIG. 3.

Figure 6:
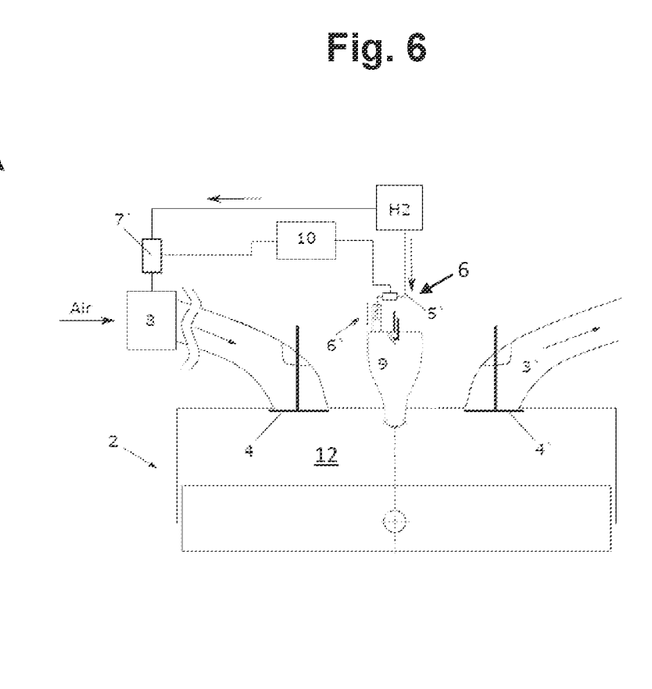
FIG. 6 illustrates a sixth embodiment of a piston-cylinder unit.

FIG. 6 shows a sixth embodiment of the present invention, wherein a further piston cylinder unit 2 is shown schematically.

Compared to FIG. 4, the embodiment of FIG. 6, only comprises a fuel supply system 6 to the main combustion chamber 12 via the pre-combustion chamber 9 (as already explained in FIG. 5). The air-fuel mixture for the intake port 3 is provided by the mixing device 8.

The remaining features correspond with the embodiment of FIG. 4.

Figure 7:
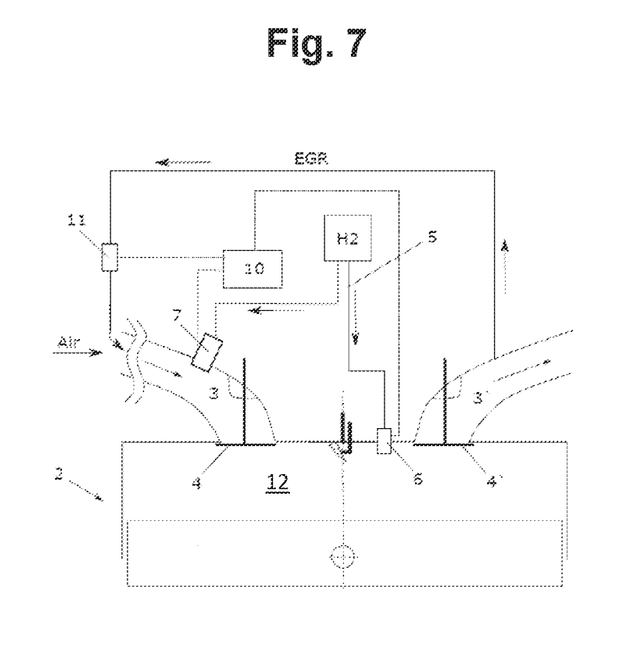
FIG. 7 illustrates a seventh embodiment of a piston-cylinder unit.

FIG. 7 shows a seventh embodiment of the present invention, wherein another piston cylinder unit 2 is shown schematically.

Compared to FIG. 1, the embodiment of FIG. 7 comprises an exhaust gas recirculation system (EGR) comprising an exhaust gas recirculation valve 11, wherein exhaust gas can be provided to the intake port 3 from the exhaust port 3'.

The control unit 10 of this embodiment is configured to:
control the port injection valve 7 (a hydrogen injector) to provide an air-fuel mixture with a lambda value higher than 1.3 to the main combustion chamber via the at least one intake valve 4, wherein the port injection valve 7 is arranged in the intake port 3,
control the exhaust gas recirculation valve 11 to admix up to 50% of the exhaust gas to the air-fuel mixture provided to the main combustion chamber 12 via the at least one intake valve 4, and
control the fuel supply system 6 to provide fuel (hydrogen) directly to the main combustion chamber 12 of the piston-cylinder unit 2 in such way that at the time of ignition of the air-fuel mixture, the lambda value of that air-fuel mixture in the main combustion chamber 12 is lower than the lambda value of the air-fuel mixture provided to the main combustion chamber 12 via the at least one intake valve 4.

Through the enrichment of the air-fuel mixture by the fuel supply system 6, an air-fuel mixture in the main combustion chamber 12 can reach preferred combustibility and/or flammability properties (e.g., a lambda value between 0.9 and 1.2) before an ignition takes place.

The remaining features correspond with the embodiment of FIG. 1.

Figure 8:
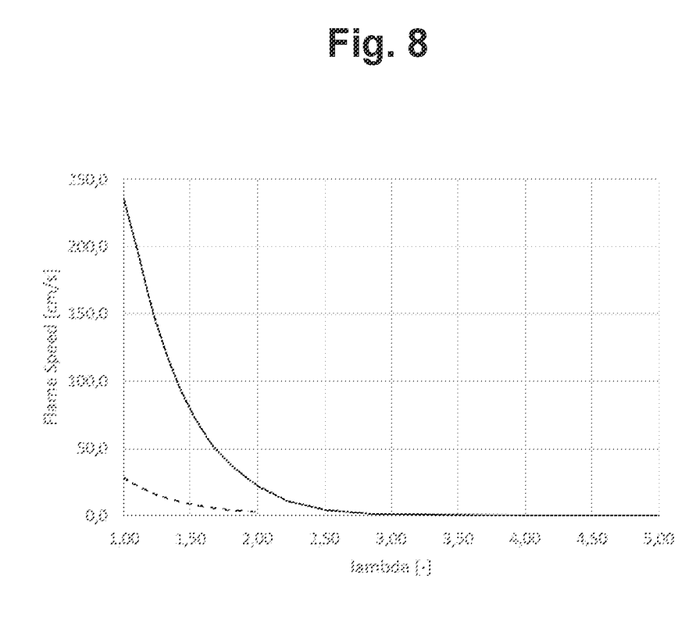
FIG. 8 illustrates a schematical diagram illustrating the flammability in respect to different lambda values.

The usage of an exhaust gas recirculation system (EGR) is, of course, not limited to an embodiment of FIG. 8 and can, e.g., also be used in the embodiments of FIG. 1-7.

FIG. 8 shows a schematical diagram illustrating the dependency of the flammability (indicated by the measurable value of the flame speed) on the lambda value of an air fuel mixture, wherein the dotted line shows natural gas as fuel and the solid line shows hydrogen as fuel.

As can be seen, the lambda value has a major impact regarding the flammability of an air-fuel mixture, wherein the risk of backfires and misfires in the intake port 3 can be reduced significantly by the present invention, by raising the lambda value of the air-fuel mixture present in the intake port 3.

Figure 9:
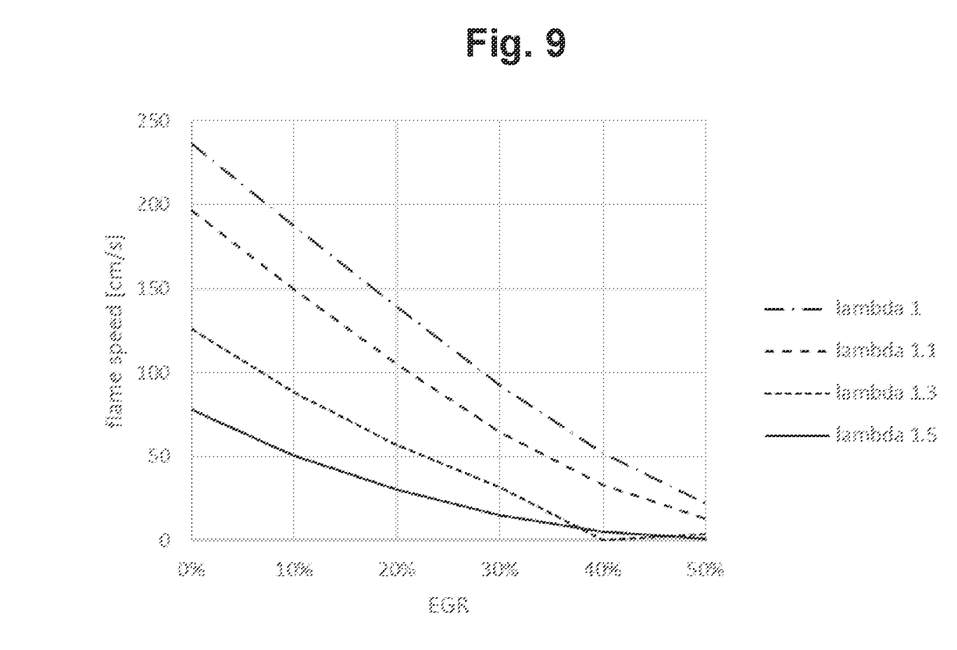
FIG. 9 illustrates a schematical diagram illustrating the flammability in respect to different EGR-rates.

FIG. 9 shows a further schematical diagram illustrating the dependency of the flammability (indicated by the measurable value of the flame speed) on the lambda value and the exhaust gas recirculation rate (EGR) for an air-fuel mixture (especially a hydrogen-air mixture) with different lambda values, wherein also a major impact of the exhaust gas recirculation rate regarding the flammability can be seen.

FIG. 8 and FIG. 9 demonstrate clearly that the risk of unwanted combustion events outside of the main combustion chamber 12 and the pre-combustion chamber 9 can be reduced effectively by raising the lambda vale and/or the EGR rate for example in the intake manifold and create the proper lambda value only inside the piston-cylinder unit 2.

Furthermore, the following table indicates the flame speeds of an air-hydrogen mixture for different lambda values. As is clearly evident, the flame speeds, which can be seen as an indicating parameter for unwanted combustion, e.g., in the intake manifold, is greatly reduced by keeping the lambda value above the lower bounds given in the claims for different EGR-rates or no EGR-rate (0%).

| EGR [%] | flame speed [cm/s] | lambda |
| --- | --- | --- |
| 0% | 236.20 | 1.00 |
| 0% | 196.51 | 1.10 |
| 0% | 126.28 | 1.30 |
| 0% | 77.55 | 1.50 |
| 10% | 187.72 | 1.00 |
| 10% | 149.86 | 1.10 |
| 10% | 88.64 | 1.30 |
| 10% | 50.79 | 1.50 |
| 20% | 139.02 | 1.00 |
| 20% | 104.75 | 1.10 |
| 20% | 57.13 | 1.30 |
| 20% | 30.39 | 1.50 |
| 30% | 92.35 | 1.00 |
| 30% | 64.89 | 1.10 |
| 30% | 31.72 | 1.30 |
| 30% | 15.21 | 1.50 |
| 40% | 51.84 | 1.00 |
| 40% | 33.39 | 1.10 |
| 40% | 0.00 | 1.30 |
| 40% | 4.94 | 1.50 |

-continued

| EGR [%] | flame speed [cm/s] | lambda |
|---|---|---|
| 50% | 21.96 | 1.00 |
| 50% | 12.63 | 1.10 |
| 50% | 3.99 | 1.30 |
| 50% | 0.78 | 1.50 |

LIST OF USED REFERENCE SIGNS 1 internal combustion engine
2 piston-cylinder unit
3 intake port
3' exhaust port
4 intake valve
4' exhaust valve
5 supply line
6 fuel supply system
6' pre-combustion chamber gas valve
7 port injection valve
7' actuator
8 mixing device
9 pre-combustion chamber
10 control device
11 exhaust gas recirculation valve
12 main combustion chamber

The invention claimed is:

1. An internal combustion engine, comprising:
at least one piston-cylinder unit in which an air-fuel mixture is combustible,
at least one intake port fluidically connected to the at least one piston-cylinder unit of the internal combustion engine, the at least one intake port being fluidically separable from the at least one piston-cylinder unit via at least one intake valve,
at least one exhaust port fluidically connected to the at least one piston-cylinder unit of the internal combustion engine, the at least one exhaust port being fluidically separable from the at least one piston-cylinder unit via at least one exhaust valve,
a fuel supply line fluidically connected to at least one fuel supply system, the at least one fuel supply system being configured to supply fuel, comprising hydrogen, directly into a main combustion chamber and/or a pre-combustion chamber of the at least one piston cylinder unit, and
an engine controller configured to control operation of the internal combustion engine, wherein the engine controller is configured to:
control at least one actuator to provide an air-fuel mixture with a lambda value higher than a threshold lambda value to the main combustion chamber via the at least one intake valve at a first crank angle before top dead center (TDC) of a piston of the piston-cylinder unit during a compression stroke, wherein the at least one actuator is arranged upstream of the at least one intake port or which is arranged in the intake port;
control the at least one fuel supply system to provide the fuel comprising hydrogen directly to the main combustion chamber and/or the pre-combustion chamber of the piston-cylinder unit at a second crank angle after the first crank angle before TDC, such that at the time of ignition of the air-fuel mixture the lambda value of that air-fuel mixture in the main combustion chamber is lower than the lambda value of the air-fuel mixture provided to the main combustion chamber via the at least one intake valve.

2. The internal combustion engine according to claim 1, wherein the threshold lambda value is 3, and wherein the engine controller is configured to control the at least one fuel supply system to provide the fuel to the main combustion chamber and/or the pre-combustion chamber of the piston-cylinder unit such that at the time of ignition of the air-fuel mixture the lambda value of that air-fuel mixture in the main combustion chamber is lower than 3.5 and higher than 1.5 in the case when the air-fuel mixture provided to the piston-cylinder unit via the at least one intake valve is 3.5 or more.

3. The internal combustion engine according to claim 1, wherein the threshold lambda value is 3, and wherein the engine controller is configured to control the at least one fuel supply system to provide the fuel to the piston-cylinder unit such that at the time of ignition of the air-fuel mixture the lambda value of that air-fuel mixture in the main combustion chamber is lower than 2.7 and higher than 2.1.

4. The internal combustion engine according to claim 1, comprising:
an exhaust gas recirculation system (EGR) comprising an exhaust gas recirculation valve, and
wherein the engine controller is configured to:
control the exhaust gas recirculation valve to admix up to 50% of an exhaust gas to the air-fuel mixture provided to the main combustion chamber via the at least one intake valve, wherein the threshold lambda value is 1.3.

5. The internal combustion engine according to claim 4, wherein the engine controller is configured to control the at least one fuel supply system to provide the fuel to the main combustion chamber and/or the pre-combustion chamber of the piston-cylinder unit such that at the time of ignition of the air-fuel mixture the lambda value of that air-fuel mixture in the piston-cylinder unit is lower than 1.1 and higher than 0.9.

6. The internal combustion engine according to claim 1, wherein the fuel supply system comprises a passive and/or active gas valve and/or at least one direct injection valve configured to directly supply fuel to the main combustion chamber and/or the pre-combustion chamber.

7. The internal combustion engine according to claim 1, wherein the at least one actuator is a fuel supply valve arranged upstream of the intake port, wherein the fuel supply valve is fluidically connected to a mixing device, and the mixing device is configured to mix air with fuel from a fuel source provided via the fuel supply valve.

8. The internal combustion engine according to claim 7, wherein the mixing device is arranged upstream or downstream of a compressor of a turbo charger.

9. The internal combustion engine according to claim 1, wherein the at least one actuator is a port injection valve being arranged in the at least one intake port.

10. The system according to claim 1, wherein the engine controller is configured to provide the air-fuel mixture via the at least one intake valve during an opening period of the at least one intake valve, and the engine controller is configured to provide the fuel with the at least one fuel supply system during an injection period of the at least one fuel supply system, wherein the injection period of the at least one fuel supply system is during a crank angle between 20° before closing of the at least one exhaust valve and 40° before the piston of the at least one piston-cylinder unit reaches the TDC during the compression stroke.

11. The system according to claim 1, wherein the second crank angle is between a closing of the at least one exhaust valve and 60° before the piston of the at least one piston-cylinder unit reaches the TDC during the compression stroke.

12. The system according to claim 1, wherein at essentially 100% possible mechanical power output of the internal combustion engine the at least one fuel supply system is configured to provide the fuel to the main combustion chamber and/or the pre-combustion chamber of the piston-cylinder unit with an energy amount of maximum 60% of the total energy amount provided to the piston-cylinder unit.

13. The system according to claim 1, wherein up to 33% of the maximal possible mechanical power output of the internal combustion engine 100% of the total energy amount is provided to the main combustion chamber and/or the pre-combustion chamber of the piston-cylinder unit via the fuel supply system and/or between 33% and 66% of the maximal possible mechanical power output of the internal combustion engine up to 60% of the total energy amount is provided to the main combustion chamber and/or the pre-combustion chamber of the piston-cylinder unit via the fuel supply system and/or between 66% and 100% of the maximal possible mechanical power output of the internal combustion engine up to 30% of the total energy amount is provided to the main combustion chamber and/or the pre-combustion chamber of the piston-cylinder unit via the fuel supply system.

14. The internal combustion engine according to claim 1, wherein the air-fuel mixture is a mixture of air and fuel comprising hydrogen.

15. A method for operating the internal combustion engine according to claim 1, comprising the following steps:
provide the air-fuel mixture with the lambda value higher than 3 to the main combustion chamber of the at least one piston-cylinder unit via the at least one intake valve, and
provide the fuel, comprising the hydrogen, directly to the main combustion chamber and/or the pre-combustion chamber of the piston-cylinder unit via the at least one fuel supply system such that at the time of ignition of the air-fuel mixture the lambda value of the air-fuel mixture in the main combustion chamber and/or the pre-combustion chamber is lower than the lambda value of the air-fuel mixture provided to the main combustion chamber via the at least one intake valve.

16. A system, comprising:
an engine controller configured to control operation of an internal combustion engine, wherein the engine controller is configured to:
control at least one actuator to provide an air-fuel mixture with a lambda value higher than a threshold lambda value to a main combustion chamber via at least one intake valve at a first crank angle before top dead center (TDC) of a piston of the piston-cylinder unit during a compression stroke, wherein the at least one actuator is arranged upstream of at least one intake port or which is arranged in the intake port; and
control at least one fuel supply system to provide a fuel comprising hydrogen directly to the main combustion chamber and/or a pre-combustion chamber of a piston-cylinder unit at a second crank angle after the first crank angle before TDC, such that at the time of ignition of the air-fuel mixture the lambda value of that air-fuel mixture in the main combustion chamber is lower than the lambda value of the air-fuel mixture provided to the main combustion chamber via the at least one intake valve.

17. The system according to claim 16, wherein the engine controller is configured to control the at least one actuator to provide the air-fuel mixture with the lambda value higher than the threshold lambda value to inhibit combustion, and the engine controller is configured to control the at least one fuel supply system to provide the fuel such that at the time of ignition of the air-fuel mixture the lambda value enables combustion.

18. The system according to claim 16, wherein the second crank angle is at least at or after 20° before closing of the at least one exhaust valve, at or before 40° before the piston of the at least one piston-cylinder unit reaches the TDC during the compression stroke, or a combination thereof.

19. The system according to claim 16, wherein the engine controller is configured to control the at least one fuel supply system to provide the fuel comprising hydrogen directly to the main combustion chamber and/or the pre-combustion chamber with an energy amount of at least up to 30%, 60%, or 100% of a total energy amount provided to the piston-cylinder unit.

20. A method, comprising:
controlling, via an engine controller, operation of an internal combustion engine, wherein controlling comprises:
controlling at least one actuator to provide an air-fuel mixture with a lambda value higher than a threshold lambda value to a main combustion chamber via at least one intake valve at a first crank angle before top dead center (TDC) of a piston of the piston-cylinder unit during a compression stroke, wherein the at least one actuator is arranged upstream of at least one intake port or which is arranged in the intake port; and
controlling at least one fuel supply system to provide a fuel comprising hydrogen directly to the main combustion chamber and/or a pre-combustion chamber of a piston-cylinder unit at a second crank angle after the first crank angle before TDC, such that at the time of ignition of the air-fuel mixture the lambda value of that air-fuel mixture in the main combustion chamber is lower than the lambda value of the air-fuel mixture provided to the main combustion chamber via the at least one intake valve.

* * * * *